US010801225B1

(12) United States Patent
Reddy et al.

(10) Patent No.: US 10,801,225 B1
(45) Date of Patent: Oct. 13, 2020

(54) HEAT PUMP OR WATER PUMP FOR A SWIMMING POOL HAVING AN INTEGRAL WATER PURIFIER

(71) Applicants: Rakesh Reddy, Boca Raton, FL (US); Kevin Doyle, Delray Beach, FL (US); William Kent, Fort Lauderdale, FL (US)

(72) Inventors: Rakesh Reddy, Boca Raton, FL (US); Kevin Doyle, Delray Beach, FL (US); William Kent, Fort Lauderdale, FL (US)

(73) Assignee: AQUACAL AUTOPILOT, INC., Saint Petersburg, FL (US)

( * ) Notice: Subject to any disclaimer, the term of this patent is extended or adjusted under 35 U.S.C. 154(b) by 0 days.

(21) Appl. No.: 15/998,471

(22) Filed: Aug. 15, 2018

Related U.S. Application Data

(60) Provisional application No. 62/545,992, filed on Aug. 15, 2017.

(51) Int. Cl.
*E04H 4/12* (2006.01)
*F04D 13/06* (2006.01)
(Continued)

(52) U.S. Cl.
CPC ......... *E04H 4/1245* (2013.01); *C02F 1/4674* (2013.01); *C02F 1/46104* (2013.01);
(Continued)

(58) Field of Classification Search
CPC ... E04H 4/1245; E04H 4/1209; E04H 4/1281; E04H 4/129; C02F 1/4674;
(Continued)

(56) References Cited

U.S. PATENT DOCUMENTS 4,328,084 A * 5/1982 Shindell ................ C02F 1/4606
204/230.8
5,422,014 A * 6/1995 Allen ..................... C02F 1/008
210/139
(Continued)

OTHER PUBLICATIONS

Derwent translated Abstract of Patent Publication EP2,290,240, Hagleitner, Published Mar. 2, 2011 (Year: 2011).*

*Primary Examiner* — Joseph W Drodge
(74) *Attorney, Agent, or Firm* — Malin Haley DiMaggio & Bowen, P.A.

(57) ABSTRACT

A pool maintenance system for maintaining desired characteristics of a body of water in fluid communication therewith, includes a chlorine generator having an integral power supply input, a water circulation pump in fluid communication with the body of water and with the chlorine generator via a series of water conduits, and a heat pump in fluid communication the water circulation pump. The water circulation pump and/or the heat pump incorporate an integral power supply/transformer functioning as a single shared power source communicatively integrating the chlorine generator with the respective water circulation pump and/or heat pump. A wired and/or wireless interface is provided electrically connected to the power supply and transformer integrated with the respective water circulation pump and or heat pump. The interface may be configured for communication with an internet-connected user-accessible device and/or a user portable smart device to enable the user to monitor and control at least the operation of the pumps and the chlorinator.

20 Claims, 10 Drawing Sheets

(51) Int. Cl.
*C02F 1/46* (2006.01)
*F04D 1/00* (2006.01)
*F04D 29/70* (2006.01)
*C02F 1/467* (2006.01)
*C02F 1/461* (2006.01)
*C02F 103/42* (2006.01)

(52) U.S. Cl.
CPC .......... *F04D 13/06* (2013.01); *C02F 2103/42* (2013.01); *C02F 2201/46125* (2013.01); *C02F 2201/46145* (2013.01); *C02F 2201/46155* (2013.01); *C02F 2209/008* (2013.01); *C02F 2303/04* (2013.01); *F04D 1/00* (2013.01); *F04D 29/708* (2013.01)

(58) Field of Classification Search
CPC ........ C02F 1/46104; C02F 2201/46145; C02F 2303/04; C02F 2201/46155; C02F 2201/46125; C02F 2103/42; C02F 2209/008; C02F 2201/46105; C02F 2201/4611; C02F 2201/4616; F04B 17/00; F04B 17/03; F04B 17/04; F04B 19/00; F04B 19/04; F04B 23/00; F04B 23/04; F04B 23/08; F04D 13/06; F04D 1/00; F04D 29/708; F04D 29/58

USPC ....... 4/488, 493, 494, 496, 509; 204/157.48; 210/167.06, 167.1, 167.11, 748.17, 748.2; 417/1, 2, 14, 36, 207, 286, 313
See application file for complete search history.

(56) References Cited

U.S. PATENT DOCUMENTS

| | | | | |
|---|---|---|---|---|
| 7,707,665 | B1* | 5/2010 | Hong | E03B 1/048 4/597 |
| 2006/0054568 | A1* | 3/2006 | Jones | C02F 1/36 210/748.03 |
| 2006/0249400 | A1* | 11/2006 | Bremauer | C02F 1/4674 205/743 |
| 2009/0038696 | A1* | 2/2009 | Levin | F04B 49/002 137/565.11 |
| 2009/0211919 | A1* | 8/2009 | Hegel | C02F 1/42 205/633 |
| 2013/0334113 | A1* | 12/2013 | Erlich | E04H 4/1209 210/167.1 |
| 2014/0303757 | A1* | 10/2014 | Pruchniewski | H04L 61/2038 700/90 |
| 2014/0303781 | A1* | 10/2014 | Potucek | A61H 33/005 700/275 |
| 2017/0209338 | A1* | 7/2017 | Potucek | B25J 9/1694 |

* cited by examiner

HEAT PUMP OR WATER PUMP FOR A SWIMMING POOL HAVING AN INTEGRAL WATER PURIFIER

CROSS-REFERENCE TO RELATED APPLICATION

This U.S. non-provisional patent application claims the benefit of, and priority to, U.S. provisional patent application No. 62/545,992, filed on Aug. 15, 2017, the entire contents of which are incorporated-by-reference herein.

FIELD OF THE INVENTION

The present disclosure relates generally to equipment for maintaining the quality of a body of pool water. More specifically, the present disclosure pertains to the integration of a pool water purification device into a swimming pool maintenance system pump, such as a water circulation pump or a heat pump.

BACKGROUND OF THE INVENTION

Initially, it is noteworthy that the present invention is described and depicted herein primarily in association with pool water maintenance. However, it will be appreciated by those skilled in the art that the invention is not intended to be so limiting. On the contrary, the present invention could be applied with respect to any of a number of different bodies of water including, for example, a spa and a residential pond.

Conventional swimming pool water maintenance systems, sometimes referred to as pool circulation systems, take water from the pool, filter it, (optionally) heat and purify it, and return the water back to the pool. Such systems generally incorporate a series of devices fluidly interconnected with one another other and with a corresponding body of pool water, via a closed loop water conduit system, through which pool water is cycled, or circulated. By way of example, such conventional maintenance system devices may include a pool water circulation pump, a water filter, a water heat pump, and a purification device such as a chlorinator.

For many years, there has been an ongoing effort by those directly involved in the pool system equipment industry, as well as by those involved in the design and installation of pool systems, to find ways to improve upon various aspects of such systems. This effort has focused upon, among other things, the following: improving the functionality, effectiveness, and efficiency of pool maintenance systems and the discrete equipment and devices of which these systems are comprised; reducing the manufacturing and production costs associated with producing pool maintenance systems and, therefore, reducing the manufacturing and production costs associated with manufacturing individual devices and pieces of equipment of which such systems are comprised; reducing costs associated with the installation of pool maintenance systems and, correspondingly, reducing the costs associated with the installation of individual devices and pieces of equipment of which such systems are comprised; reducing the overall power consumption associated with the operation of pool maintenance systems, including, for example, reducing the power consumption associated with the operation of individual equipment and devices of such systems; increasing the reliability of individual pool maintenance system equipment and devices and, thereby, increasing overall system reliability; decreasing costs associated with the production, installation, and operation of pool maintenance-related equipment and devices; increasing the efficiency and efficacy of swimming pool related water purification processes; simplifying the manufacturing, installation, and subsequent operation of pool maintenance systems; and developing ways to improve the functionality of existing pool maintenance equipment/devices and related equipment/device features, as well as inventing new and improved device/equipment features.

The heart of any pool maintenance system is the water circulation pump, which generates and maintains the flow, or circulation, of water through the circulation system. The pool water circulation pump primarily drives the circulation of pool water, drawing pool water from the main body of pool water, through pool outlets, such as the main drain, into the front of the water circulation pump, for fluid communication through a series of pool water maintenance devices, or equipment, interconnected to one another by a series of conduit sections through which the circulating water travels before being reintroduced back into the main body of pool water through pool water returns. Commonly, the interconnected devices and equipment include a pool filter, a pool water-heating pump, or heat pump, and a pool water purification device, such as a chlorinator.

During normal operation of a pool water maintenance system, the water circulation pump typically draws the greatest amount of energy over time due, in large measure, to the fact that it has the greatest up time, or time of operation. The energy drawn by a pool maintenance system water pump is rivaled by that of a pool/spa heat pump, which also draws substantial energy while being operated to reach, and subsequently maintain, a desired pool and/or spa water temperature. The water circulation pump typically operates in association with a pump controller and a timer, which are tasked with the scheduling and monitoring of its operation. In addition to the aforementioned pool maintenance system devices and components, a master panel controller (i.e. a complex integrated computer control system) is often incorporated as a form of timer and/or control for the pool pump and related electrical equipment. State of the art computer driven controllers provide control of numerous electrical loads. Such additional components can significantly drive up the expense of pool maintenance systems.

One of the most basic pool water maintenance system sub-components is the water purifier, or water sanitizer, which, in a majority of systems consist of a chlorination system, or chlorinator. Salt water chlorination is a process that uses dissolved salt as a store for the chlorination system. The chlorine generator (alternatively referred to as a "salt cell," a "salt generator," and a "salt chlorinator") uses electrolysis in the presence of dissolved salts to produce hypochlorous acid and sodium hypochlorite, which are the sanitizing agents already commonly used in swimming pools. The chlorinator cell typically consists of parallel titanium plates coated with ruthenium and sometimes iridium. Older models make use of perforated (or mesh) plates rather than solid plates. Electrolysis naturally attracts calcium and other minerals to the plates. The benefits of such salt systems in pools include the convenience and the constant delivery of pure chlorine-based sanitizer. The reduction of irritating chloramines versus traditional chlorinating methods and the "softening" effect of electrolysis reducing dissolved alkali minerals in water are also perceived as benefits.

Conventional salt water chlorinators include a chlorine cell and a control board. The cell is the part of the system that actually converts the salt into chlorine. Water passes through the cell and over solid plates (e.g. parallel titanium plates coated with ruthenium or iridium). These naturally-occurring metals are charged from the control board and allow the salt to convert to chlorine via electrolysis. The control board is the control center of the system. Its primary purpose is to provide electricity for the process, and it also allows pool owners to control the amount of electricity communicated to the chlorination cell, thereby allowing pool owners to selectively increase or decrease the quantity, and thereby the concentration, of chlorine in the pool water. Although other sub-components are often used, they are usually not essential to operation of the pool or maintenance of the body of pool water. Accordingly, an efficiency, or economy, of components can be achieved by combining the water circulation pump and the chlorinator into a single combined, or integrated, system. Likewise, increased efficiency, or economy, of components can be achieved by combining the pool's heat pump with the chlorinator. That is, by integrating the chlorinator (or other water purification device) into the heat pump.

Although water circulation and heat pumps have existed, independently, with chlorinators for many years, to date, applicants are unaware of any systems successfully combining either a water circulation pump or heat pump with chlorinators or similar water purification systems. This is not surprising, since myriad design hurdles exist, including, for instance, addressing maintenance and service issues with either system, replacement of components, heat distribution and dissipation/removal, and the like. However, there would be significant benefits derived by providing a water circulation pump or a heat pump having a water purification device, particularly a chlorinator, directly integrated therewith (e.g., benefits including, but not limited to, reduced manufacturing costs, reduced operating costs, and various efficiencies vis-a-vis the control and operation of the pool maintenance system, to name just a few).

Accordingly, there is a well-established, as-of-yet unmet, need for an improved pool water maintenance system, wherein the functions and operations of a pool water circulation or heat pump has integrated therewith a water purification device, such as a salt water chlorinator. Significantly, such a combined sub-system would enable utilization of the power input associated with the corresponding pump to drive operation of both the pump and the respective purification device. Furthermore, such a sub-system could be controlled and scheduled from a common system controller, utilizing its own, single timer. It would provide multiple power level options for operating the pump, increasing the pump's energy efficiency while operating concurrently with the purification device (e.g. a chlorinator) to minimize energy usage, or consumption.

Furthermore, such usage could be easily coordinated vis-à-vis operation scheduling such that peak device operation times are made to coincide with off-peak, or low, utility usage time periods, thereby reducing operating costs and providing greener systems vis-à-vis conventional systems with independent purification devices and pumps. Such a system would provide a further benefit of facilitating installation through the use of a single, simple power input.

SUMMARY OF THE INVENTION

In one aspect, the pump system with integrated chlorinator unit is user friendly and easy to install for the owner, requiring few if any special service calls by a professional for repair and replacement.

In another aspect, the combined unit provides a more reliable, robust pump that is self-sanitizing with a chlorinator powered by the pump via enhanced controls and enhanced and improved user interface features.

In another aspect, an apparatus and method is provided whereby a controller, pump and chlorinator blades are all incorporated, or integrated, within a common enclosure, or housing, facilitating installation and parts replacement.

In another aspect, the incorporation of a common, or shared, enclosure enables cooling of the controller through the use of inline water functioning as a heat sink for the controller.

In another aspect, the apparatus and method of the present invention enables extraction of system data obtained during system operations from the pump and chlorinator, including use of a network or optical data storage system.

The invention includes an apparatus, a method for operating the apparatus, and a method for using the apparatus.

These and other aspects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate, but not to limit, the invention, in which.

Like reference numerals refer to like parts throughout the several views of the drawing figures.

DETAILED DESCRIPTION OF EXEMPLARY IMPLEMENTATIONS

Figure 1:
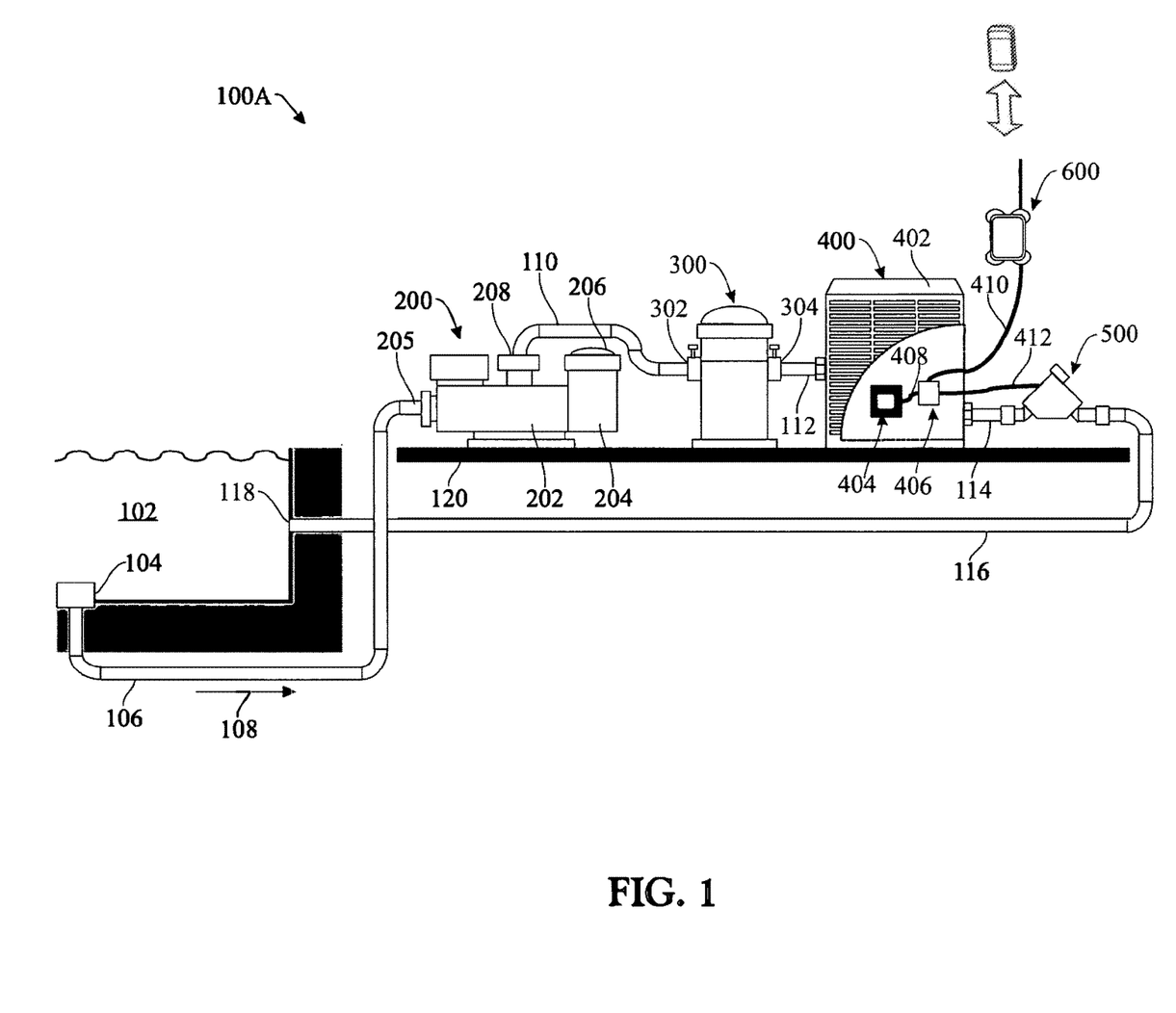
FIG. 1 presents a front elevation view of a pool system incorporating a salt water chlorinator 500 integrated with the functionality/operation of a heat pump 400, with a portion of a heat pump housing 402 shown partially cut away to expose internal components; namely, a power supply/transformer 404 and chlorinator driver 406, in accordance with a first exemplary embodiment 100A of the present invention, wherein a chlorinator assembly 500 is electrically coupled with heat pump 400 while located exteriorly of heat pump housing 402.

Referring now particularly to FIG. 1, a front elevation view of a pool circulation, or maintenance, system 100A is shown in accordance with a first exemplary embodiment of the present invention. The system is particularly designed, and otherwise configured, to combine the functionality and operation of a chlorinator 500 and pool heat pump 400 in lieu of conventional pool systems in which each of these components is typically provided as an independently driven and operated component—thereby, functioning to replace an existing independent heat pump and chlorinator 500 in a pool water circulation and sanitation system. The system 100A may utilize sub-components, as are currently available, but incorporates a single electrical power supply and transformer 404 requiring fewer wiring connections to be made upon installation vis-à-vis conventional systems, as shown. The system 100A is provided for operating upon a pool, or similar contained body of water 102, entering the system, for example, via a main pool drain 104, through a first length of conduit, or conduit section 106 and flows (as depicted by water flow directional arrow 108), into a water-receiving end, or inlet, of a water circulation pump 200. Subsequently, the water is urged, via water pump 200, into pump inlet 205 through an interior of the pump 200 for egress through pump outlet 208, and flows through conduit length, or conduit section 110, into inlet 302 of water filter 300. The flow of water continues through the interior of the filter for egress through filter outlet 304, and continues to flow through conduit length, or conduit section 112, into system heat pump 400. Subsequently, the flow of water continues through an interior of housing 402 of pool water heater 400 for egress through a heater outlet, through conduit length, or conduit section 114, into chlorinator 500. Subsequently, the treated water is returned via conduit length, or conduit segment 116 for return to water body 102 via pool return outlet 118. As further shown in FIG. 1, integrated with heat pump 400 are main power supply/transformer 404 and chlorinator driver 406, which drives chlorinator 500. Furthermore, power supply/transformer 404 is electrically connected, via electrical wiring length 408, to chlorinator driver 406, which is subsequently electrically interconnected with dongle 600, via electrical wiring segment 410, and further interconnected with chlorinator 500 via independent electrical wiring segment 412.

Referring now briefly to water circulation pump 200, the main parts of a conventional water pump include: a strainer basket cover 206 that provides access to the strainer box 204, alternatively referred to as a water pump filter basket housing portion, to add water and clean out debris; a strainer basket (not shown) that filters the larger pieces of the debris; a diffuser (not shown) that directs water to, and collects water from, an impeller (not shown); the impeller (not shown) that generates water pressure through centrifuge; and the motor (not shown) that drives the impeller. The water circulation pump 200 further includes an inlet port 205 through which water enters the pool pump from the pool, and an outlet port 208 through which water exits the pump for eventual return to the pool. The water circulation pump has a main housing portion 202, which houses the pump electronics, impeller, diffuser, and related internal components. As shown, all of the primary components of the system (e.g. circulation pump 200, water filter 300, and heat pump 400) are fixedly secured to a ground support surface 120, such as a concrete slab.

Figure 2:
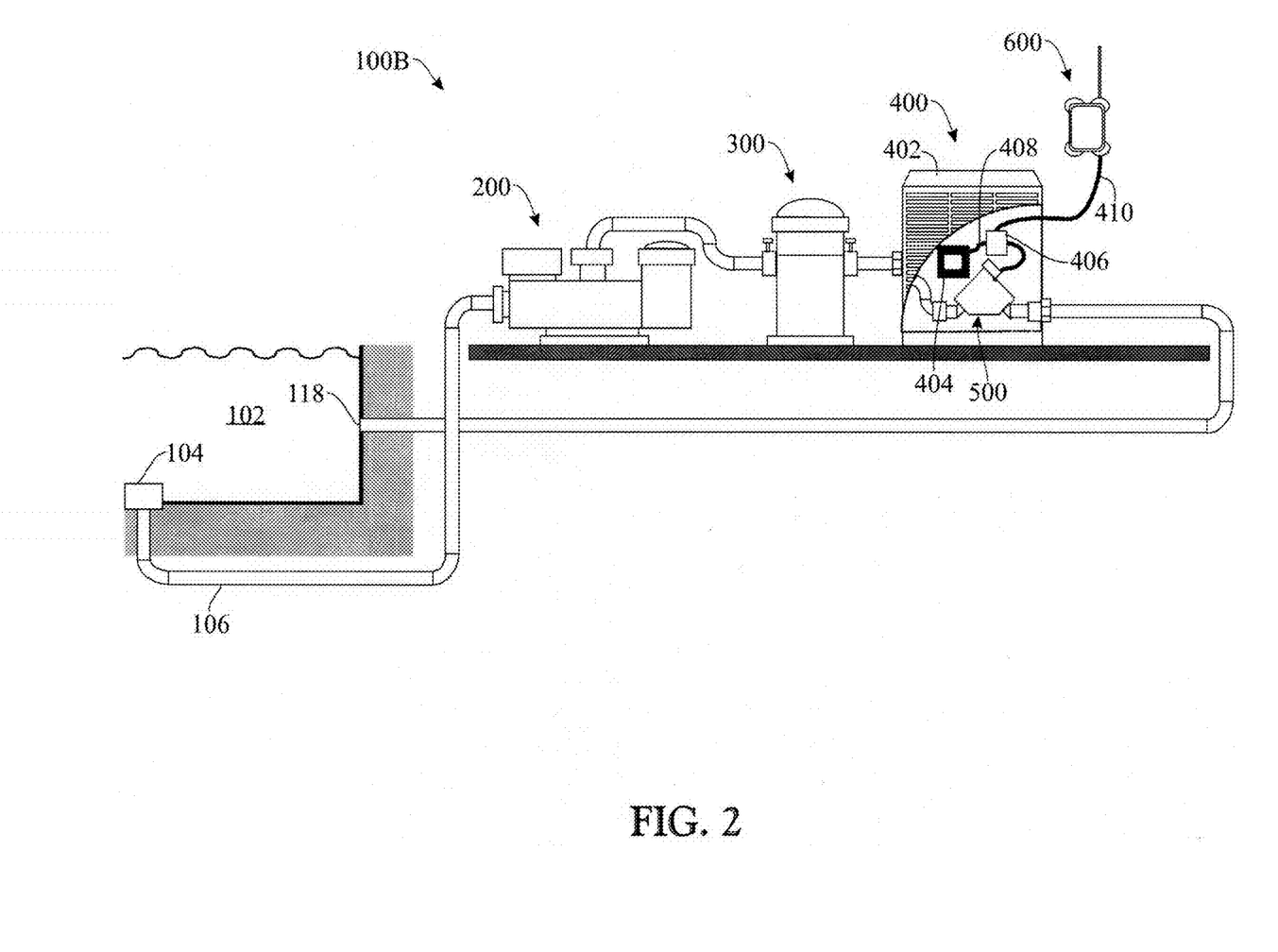
FIG. 2 presents a front elevation view of a pool system incorporating a salt water chlorinator 500 integrated directly into the interior of heat pump 400, with a portion of heat pump housing 402 shown partially cut away to expose the chlorinator assembly 500, power supply/transformer 404, and chlorinator driver 406, in accordance with a second exemplary embodiment 100B of the present invention.

Referring now particularly to FIG. 2, a pool system 100B is shown in connection with a second exemplary implementation, or embodiment, of the invention. Pool system 100B is generally similar to the arrangement previously described in connection with FIG. 1; however, in this exemplary implementation chlorinator 500 is integrated within housing 402 of heat pump 400, where it is directly electrically connected, via electrical wiring segment 405, with chlorinator driver 406, which, in turn, is directly electrically connected, via electrical wiring segment 408, to power supply/transformer 404, and independently directly electrically connected, via electrical wiring segment 410, to dongle 600.

Figure 3:
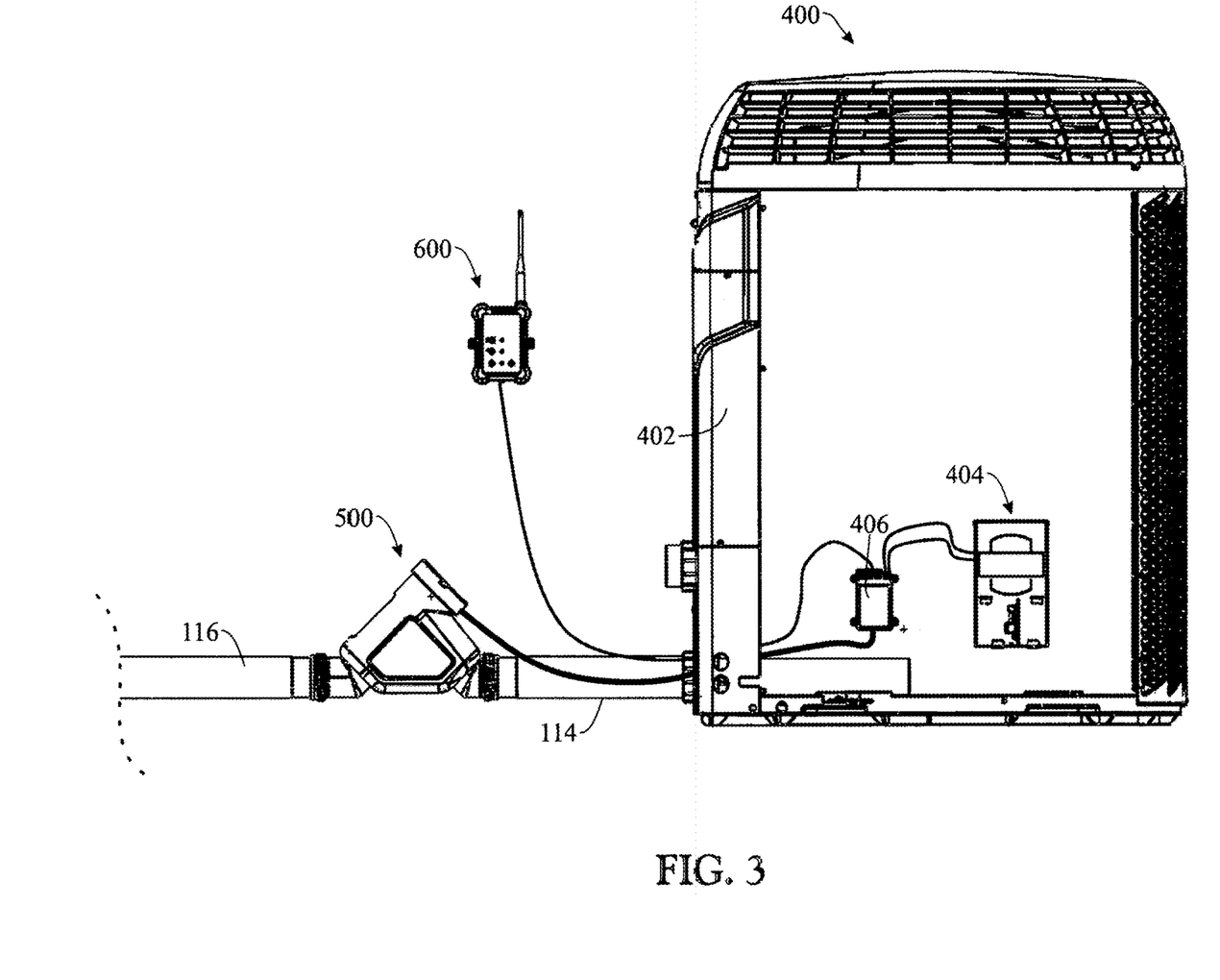
FIG. 3 presents an enlarged front elevation view of the heat pump 400, chlorinator assembly 500, and dongle 600, with a front panel of the heat pump housing 402 removed to expose a dedicated/shared power supply/transformer 404, and electrically coupled chlorinator driver 406 directly powering exteriorly located chlorinator 400 and dongle 600, in accordance with the arrangement of the first exemplary embodiment 100A introduced in FIG. 1.

Referring now briefly to FIG. 3, a particular arrangement wherein dedicated shared power transformer 404 and chlorinator driver 406 components, housed within housing 402 of heater 400, are shown in greater detail, in accordance with the system implementation 100A of the first embodiment introduced in FIG. 1. In particular, FIG. 3 more clearly depicts the integration of power supply/transformer element 404 and chlorinator driver element 406 with heat pump 400, wherein power supplied by dedicated shared power supply/transformer 404 is in direct electrical communication with chlorinator driver 406, and chlorinator driver 406 is, in turn, in direct electrical communication with both chlorinator 500 and dongle 600. Dongle 600 provides an interface configured, for example, for wireless communication with any of a variety of personal electronic devices, including, for example, a portable digital smart device (e.g. a smartphone digital tablet, wearable digital device, etc.), a computer, and the like. As is well known in the pool industry, such an interface enables a system user (e.g. a pool owner) to remotely monitor and control the key functions of a pool or spa directly from the personal electronic device. For example, a user can easily control and monitor multiple pool system functions (e.g. water circulation pumps, heat pumps, salt chlorine generators, oxidation reduction potential (ORP) and pH testing and related dispensing, etc.) using one interface.

Figure 4:
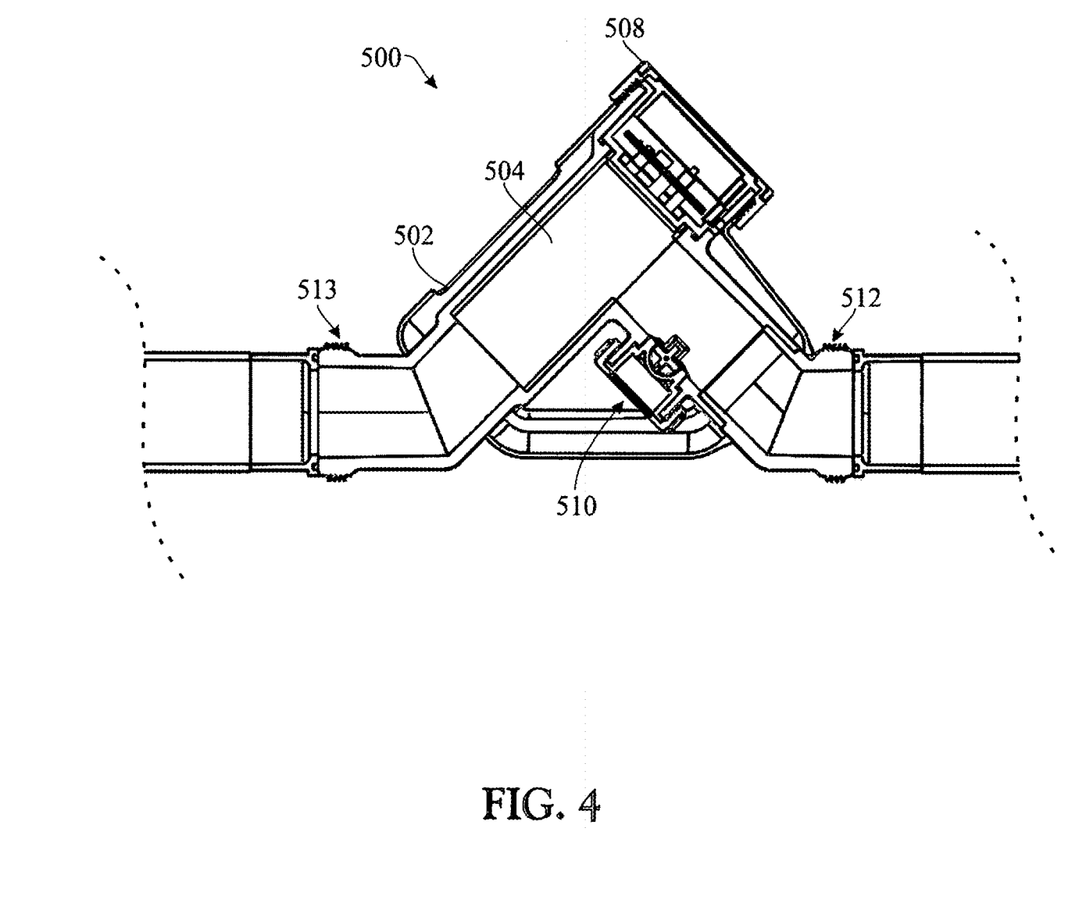
FIG. 4 presents an enlarged, further detailed, front elevation view of the chlorinator assembly 500 depicted in FIG. 3.

Referring now primarily to FIG. 4, the chlorinator 500 of the present invention is shown in greater detail. Briefly, it is important to note that although a chlorinator is used in accordance with a preferred implementation, the invention is intended to more broadly cover the incorporation of any water purification apparatus now available, including, for example ultraviolet light (UV) water purification, or any future developed purification devices. Generally, chlorinator 500 includes a (typically cylindrical) shell 502 housing an electrolysis cell, identified generally as reference numeral 504, which is typically in the form of a series of parallel electrode plates 506 (FIG. 5), alternatively referred to as an "electrode bundle" or the like, a capped closed end 508, a pair coupling subassemblies 512, 513 at opposite ends of the chlorinator 500, for enabling the flow therethrough of circulating pool water, and an integral control circuit, shown generally as reference numeral 510. Significantly, the control circuit 510 for the electrolysis cell is contained within a separate chlorinator cell housing portion that is in electrical communication with the general electrolysis cell housing. The control circuit 510 preferably includes a flow sensor (not shown) for sensing the flow of salt through the electrolysis cell, or chlorination cell 504, and a temperature sensor (not shown) for measuring the temperature of the water flowing through the cell. The control circuit receives an input power supply, having a stepped-down voltage, communicated from chlorinator driver 406 contained within housing 402 of heat pump 400, to drive the chlorinator 500, and may provide at least the basic functions of a power supply to the water circulation pump 200, a direct current (DC) power supply to the electrodes of the electrolysis cell, which is also structurally a part of the control circuit and the electrolysis cell, and a signal from a pH probe within the electrolysis cell. That is, control inputs to the control circuit 510 preferably include at least: (1) a saltwater flow or no-flow signal from a flow sensor that is structurally part of the control circuit and electrolysis cell; (2) a temperature signal from a temperature sensor that is also structurally part of the control circuit and electrolysis cell; and (3) a signal from an oxidation reduction probe (ORP) also within the electrolysis cell. Significantly, the flow sensor provides accurate flow data to monitor, or count, the "turns" of water over time. For instance, saltwater flow data may be provided in units of gallons of water flowing past the sensor per minute.

Figure 5:
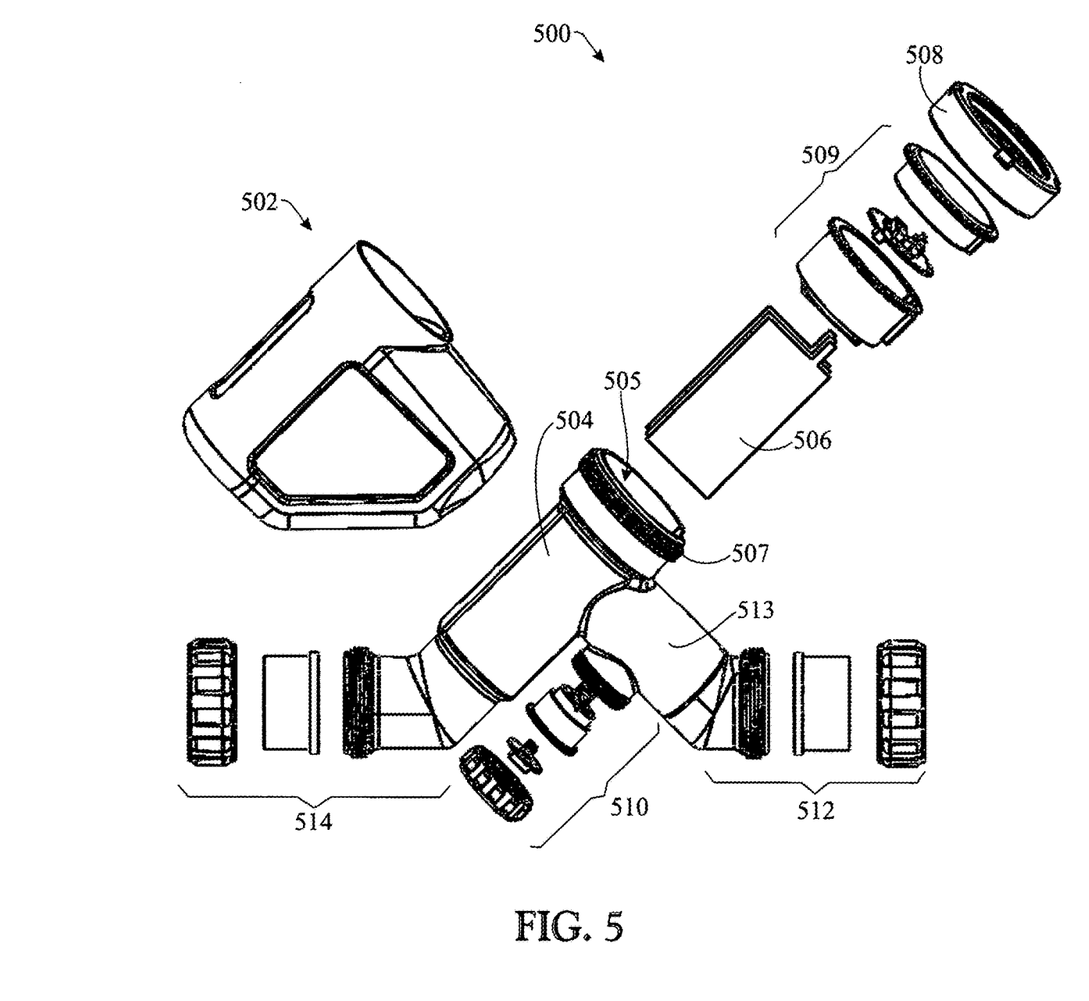
FIG. 5 presents a top-right exploded view of the chlorinator assembly 500 of FIG. 4.
Figure 6:
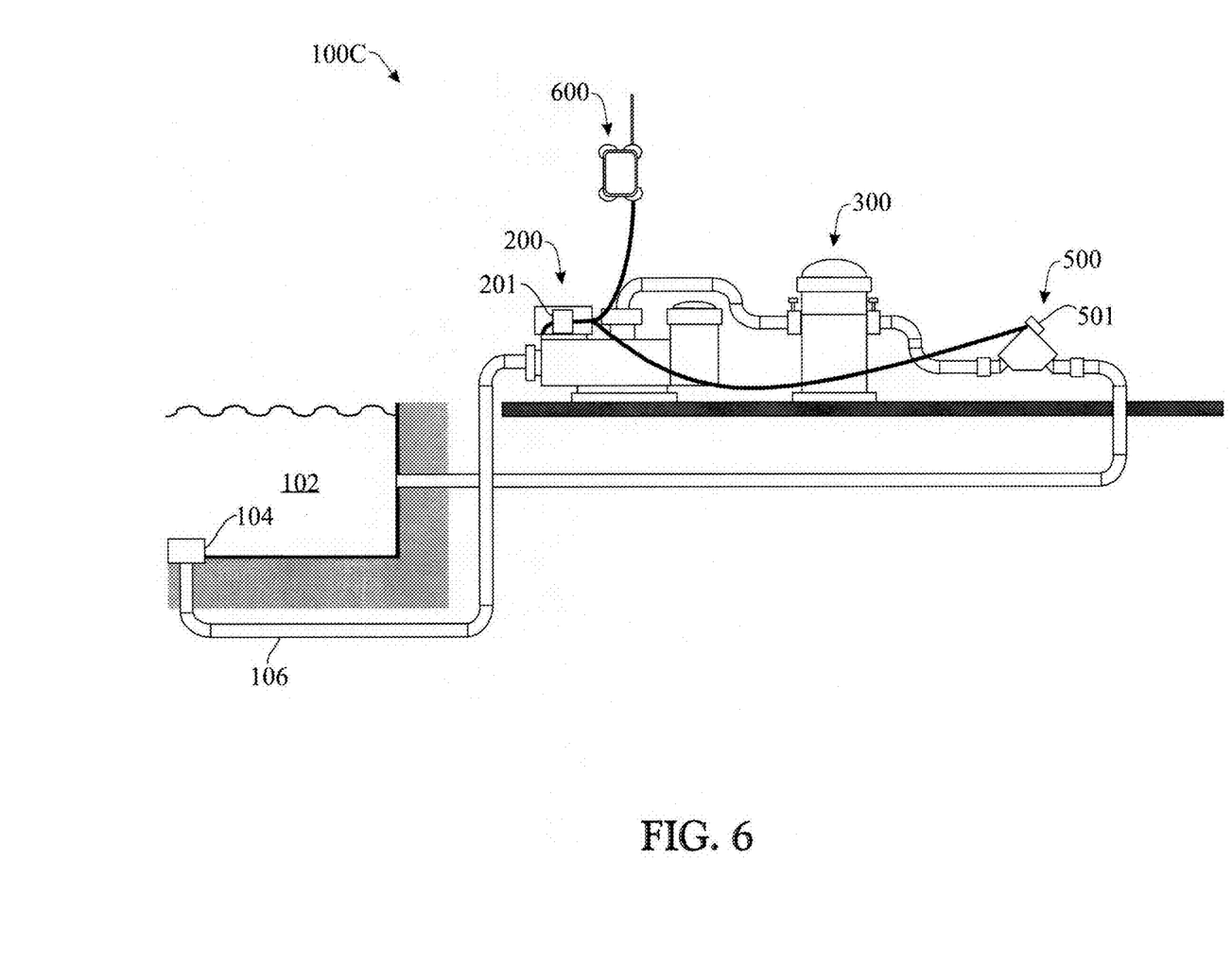
FIG. 6 presents a front elevation view of a pool system absent a heat pump, but incorporating a power supply 201 integrated with a water circulation pump 200, and a salt water chlorinator assembly 500 electrically coupled to common power supply 201 via chlorinator power input 501, in accordance with a third exemplary pool system embodiment 100C.
Figure 7:
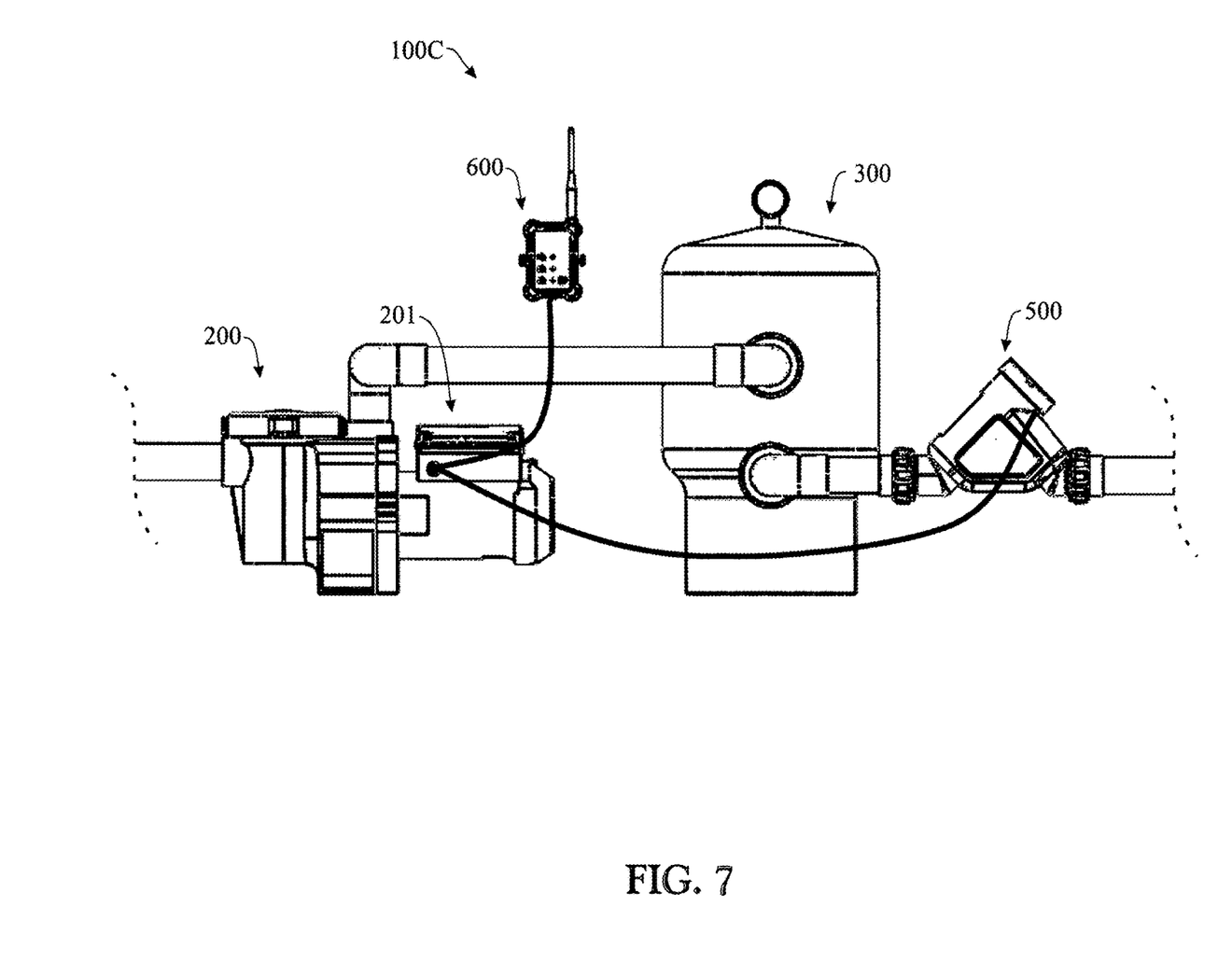
FIG. 7 presents an enlarged, further detailed, front elevation view of the chlorinator 500, filter 300, water pump 200, and dongle 600 introduced in FIG. 6, with the precise arrangement of the water pump 200 with integral power supply 201, chlorinator 500, and dongle 600 slightly altered.
Figure 8:
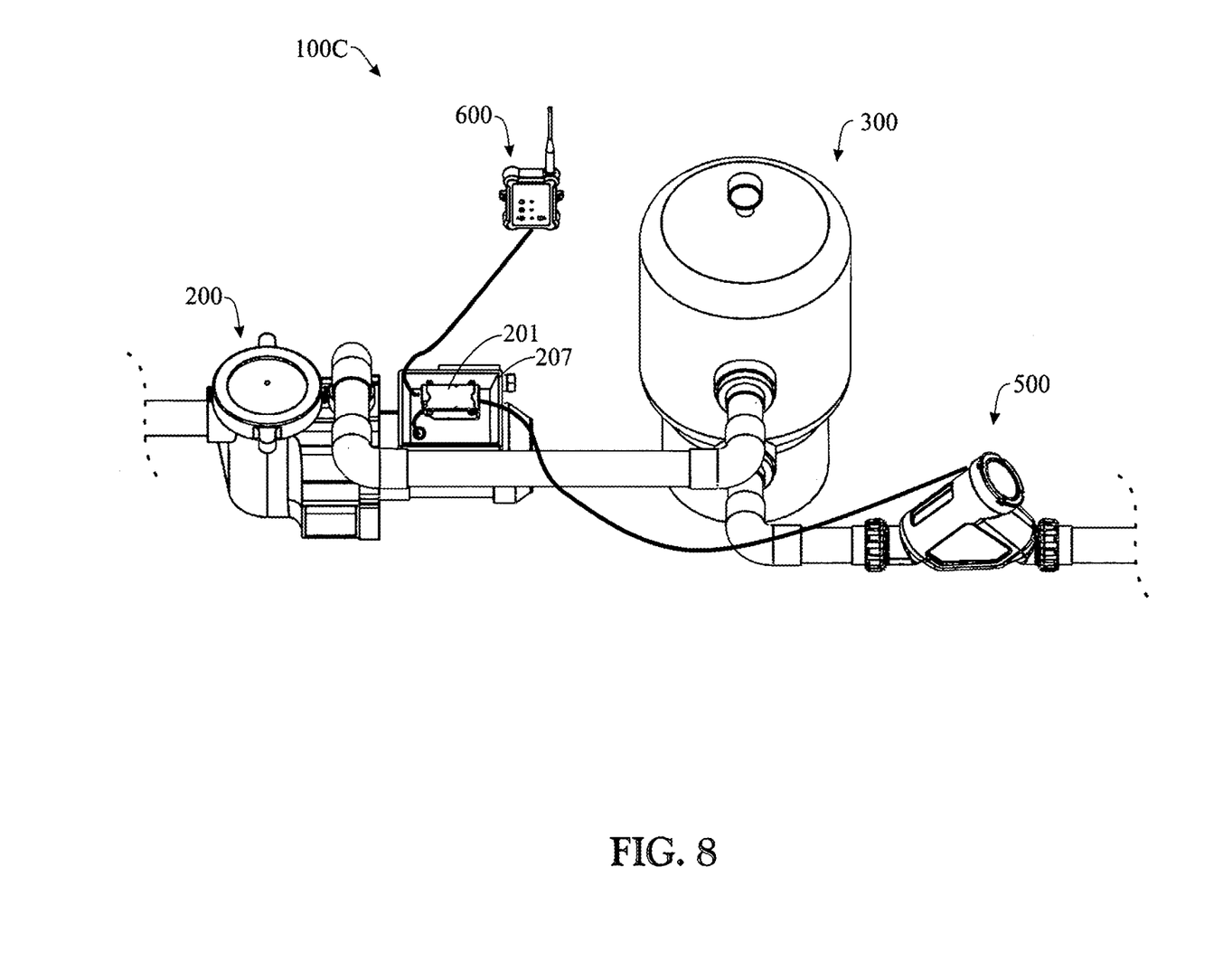
FIG. 8 presents a top-front perspective view of the system 100C in FIG. 7, with a top panel power supply housing 207 removed to expose a main common power supply 201 providing power to chlorinator 500, water circulation pump 200 and dongle 600.
Figure 9:
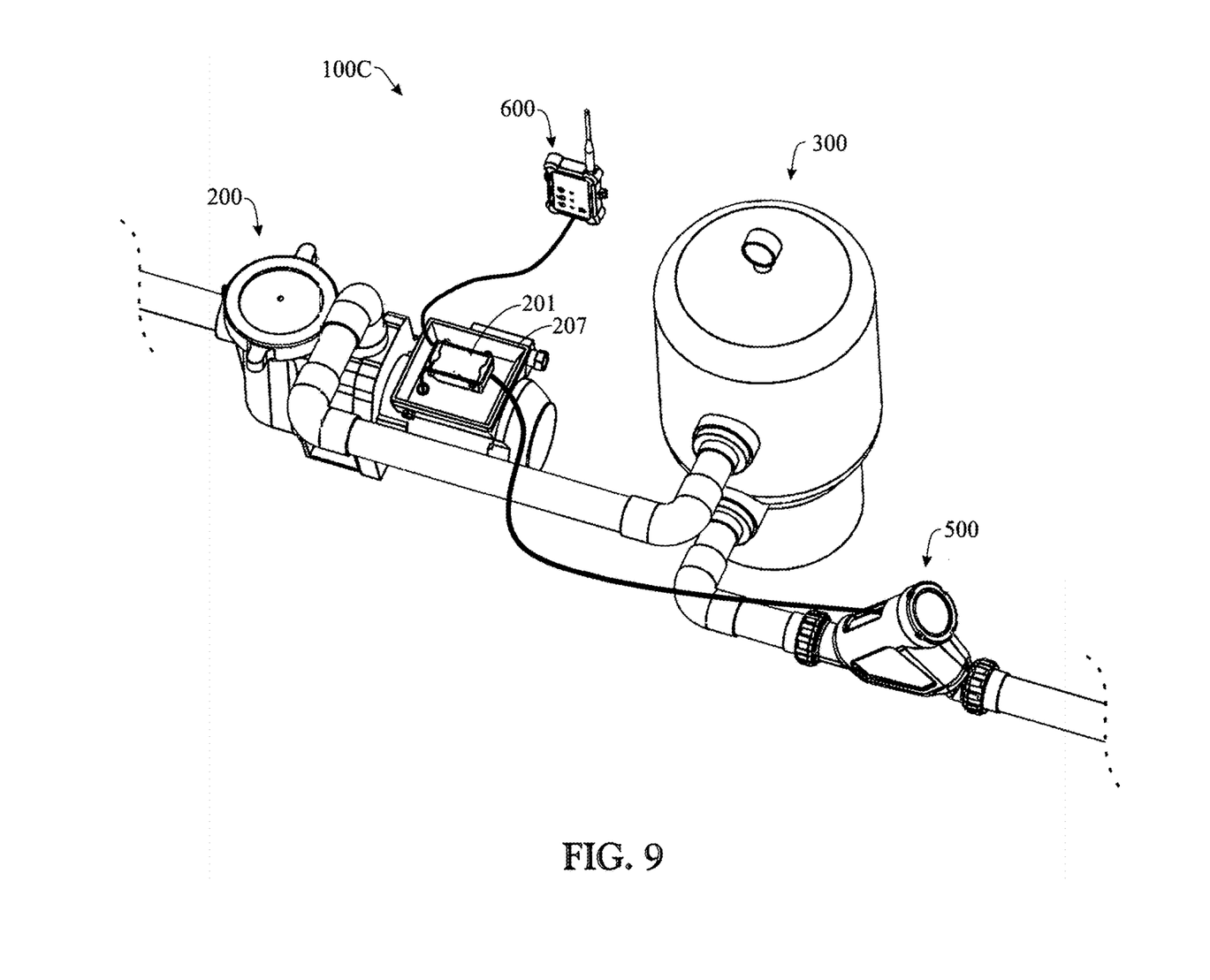
FIG. 9 presents a top-right perspective view of the system 100C shown in FIG. 8.
Figure 10:
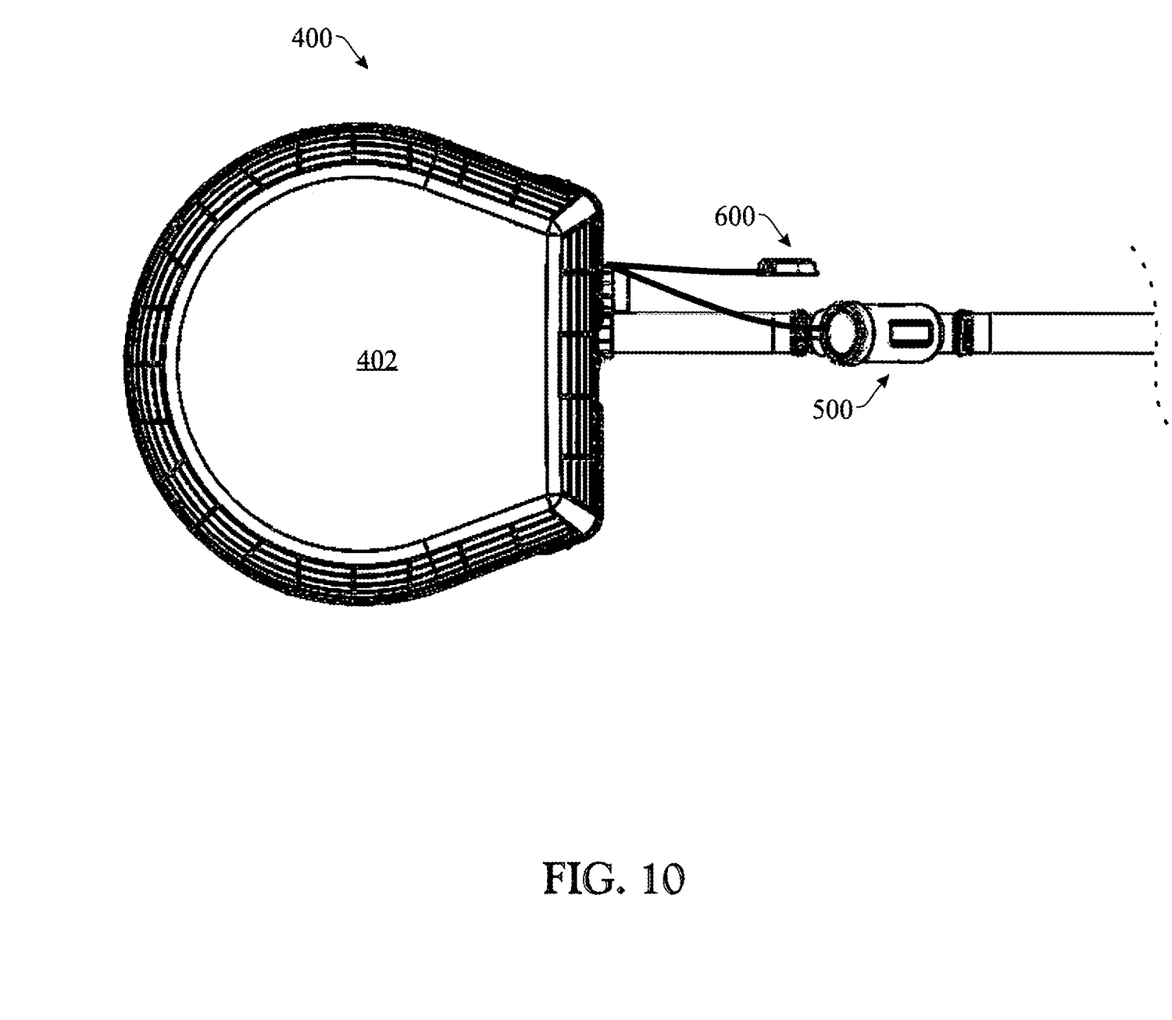
FIG. 10 is a top plan view of the heater 400, chlorinator 500, and dongle 600 of FIG. 3.

Referring now primarily to FIG. 5, chlorinator 500 may incorporate a main housing portion 502 having received therethrough a chlorinator cell housing 504 incorporating an externally threaded opening 505 for facilitating the receipt of solid electrode plates 506 within an interior of the chlorinator cell housing 504. A cap 508 may be selectively releasably attached, via coupling assembly 509, to cover receiving opening 505. As shown, the control circuit, shown generally as reference numeral 510, is actually in the form of a subassembly configured to be selectively fixed in within a secondary chlorinator housing portion 513 in fluid communication with chlorinator cell housing portion 504. A further coupling subassembly 514 is provided at a water flow inlet portion of chlorinator cell housing 504 for coupling with an existing circulation system conduit, along with an identical coupling subassembly 512 provided, for the same purpose, at the water flow outlet portion of control circuit housing portion 513 of the chlorinator 500.

Again, the chlorine generator 500 uses electrolysis in the presence of dissolved salts to produce hypochlorous acid and sodium hypochlorite, for sanitizing the pool water. The chlorinator cell solid electrode plates 506 may, for example, be provided in the form of a plurality of parallel titanium plates coated with ruthenium or iridium. Electrolysis naturally attracts calcium and other minerals to the plates. The benefits of such salt systems in pools include the convenience and the constant delivery of pure chlorine-based sanitizer. The reduction of irritating chloramines versus traditional chlorinating methods and the "softening" effect of electrolysis reducing dissolved alkali minerals in water are also perceived as benefits.

In operation of the system, flowing pool water passes through the cell and over the coated parallel electrode plates 506. As a naturally-occurring metal, the titanium plates are charged from the control board, or control circuit 510, enabling the salt to convert to chlorine via electrolysis. The control circuit is the control center of the chlorinator subsystem. Its primary purpose is to provide electricity for the process, and it also enables user control over the amount of electricity communicated to the chlorination cell to selectively increase or decrease the quantity, and thereby the concentration, of chlorine in the pool water. In accordance with the present invention, an efficiency, or economy, of components is achieved by functionally coupling the chlorinator 500 with either the water circulation pump 200, for example, via a shared power supply/transformer element 201 integrated into water circulation pump 200 (e.g. see FIGS. 6-9), or with the heat pump 400 via dedicated shared power supply/transformer 404 and chlorinator driver 406 electrically interposed between the heat pump power supply/transformer and chlorinator 500 (e.g. see FIGS. 1-3 and 10). Furthermore, chlorinator 500 may be physically, or structurally, integrated with water heat pump 400 (e.g. as depicted in FIG. 2). Alternatively, chlorinator 500 may be integrated with the pool system exteriorly of housing 402 of heat pump 400 (e.g. as depicted in FIG. 3).

Referring now primarily to FIGS. 6-9, in accordance with yet a third exemplary implementation of the present invention, chlorinator 500 may be electrically coupled with a remotely located power supply/transformer 201 physically integrated with water circulation pump 200, as generally represented by pool maintenance system 100C. Significantly, the shared dedicated single power supply/transformer 201 (i.e. a single transformer with a single power input) of circulation pump 200 powers the circulation pump 200 and chlorinator 500, as well as electrically coupling dongle 600 with the system. In this manner, the present invention is easily applied to a pool maintenance system absent a heat pump.

As shown in each of the exemplary embodiments or implementation 100A, 100B, and 100C, the electrical integration of a water purification device 500 with either a water pump 200 or a heat pump 400 enables and facilitates the powering and control of multiple system components using a single, shared power supply/transformer, for example, power supply/transformer 201 electrically coupled to chlorinator power input 501 (FIGS. 6-9), and power supply/transformer 404 (via chlorinator driver 406) electrically coupled to chlorinator power input 501 (FIGS. 1-3 and 10). In each exemplary implementation, a single transformer powers the respective pump and chlorinator and is controlled by a controller communicatively coupled to each component for controlling the power to each of the pump and chlorinator.

Significantly, exemplary implementations of the present invention provide for a single power transformer having a controller for the respective components coupled to it, thereby reducing redundancy. A series of higher voltage relays (not shown) in a respective housing with the transformer/controller can then couple the individual components. Optionally, the system can provide a single footprint for the pump and chlorinator in a single housing (see FIG. 2) to reduce physical space requirements, further simplify the plumbing, and providing the single power input for both elements. Accordingly, the present invention achieves efficiencies in component costs and installation costs, reducing the number of connections performed at installation and the complexity of the plumbing of the system. The cost is further reduced by the single controller and the single transformer operating and controlling both the pump and the chlorinator.

The pump 200, 400 is plumbed to the purification system 500, which is an electrolytic cell chlorinator in a preferred implementation. However, as previously stated, the purification system 500 can be of any appropriate type. In the case of an electrolytic cell chlorinator, the water flows into the chlorinator through and between a series of electrolytic plates. The electrolytic plates are typically matched sets of anode and cathode plates comprising any suitable material enabling the provision of an electrical current sufficient to separate the chlorine from a sodium molecule to provide chlorination. The process of electrolytic chlorination in this fashion is well known in the art. Other purification systems, such as chlorine feed pumps for liquid injection, reverse osmosis, UV treatment, and the like can be utilized as well, or incorporated in combinations, to provide the appropriate sanitation of the inflow of water. Again, a controller mechanism, or unit, may be coupled to and control the chlorinator, and may be provided in the form of a user interface (not shown), such as a portable smart device communicatively coupled via dongle 600. The controller may include, but is not limited to, for example, a printed circuit board (PCB), one or more LEDs, and a coupling to one or more sensors (as previously described), and similar analog and digital electronic components and couplings. The controller unit may be communicatively coupled to the respective pump, pump motor, electrolytic plates, one or more sensor inputs, and to the respective power source, depending upon the particular embodiment/implementation.

The power source coupling is the principal external coupling in the exemplary implementations that may require installation. The remaining connections can be completed prior to shipping the device. This minimizes the necessary electrical connections and, to further ease installation, the coupling with the power source can utilize a simple plug or similar connector to connect the system. This obviates the need for a professional repairperson to do maintenance and replacement of the system. Depending upon the particular implementation, this may be the only electrical connection necessary, although additional connections can be provided for communication of the chlorinator controller with other controllers or output or storage devices. The controller, for example, can be in communication with a heat pump controller or a water circulation pump controller.

With regard to the sensors (e.g. flow and temperature sensors) provided in the chlorinator, a flow sensor can detect when water is being pumped through the chlorinator, or similar device, and, in turn, can communicate with the respective controller. With the at least one sensor incorporated in the device, it can detect operational parameters, which may include, but is not limited to, pump operation times, pump speeds, duration of pump operation, duration chlorinator (or other water purifier) operation, operational temperatures of system components, temperature of the water, power consumption, water pH, water salinity, supply and demand voltages, supply and demand amperages, and similar parameters regarding the pump or the chlorinator.

These parameters can be reported to the controller and the user interface. The user can then establish operations of the system. Via the user interface, the controller can, for instance, schedule operation times for the respective pump or operational thresholds for the pump based on reported parameters. In this manner, as stated previously, the water circulation pump can be operated to circulate water at user-selectable speeds and times to maximize energy efficiency. Similarly, the sensed parameters for the chlorinator can be set and then reported to the controller, which communicates with, in the case of a chlorinator, the electrolytic plates to chlorinate the water.

Via a particular sensor, the controller can also report maintenance-related issues. For example, where a probe or sensor detects parameters consistent with the electrolytic plates being fouled by scale or buildup, the sensors would communicate, to the controller, the potential scale/buildup based upon, for example, excess energy being consumed by the chlorinator plates. The output of these sensors can trigger, for example, an alert communicated to the user interface to indicate when chlorinator electrolytic plates require replacement and/or the degree to which the plates are operating, or performing. In such instances, the system may further employ a voltage reversing technique to reduce the buildup.

The controller unit is also capable of storing and reporting data pertaining to systems operation. Parameters such as energy used, voltages, service times, time in particular operating states, historic data, cleaning cycles, and similar operational variables can be measured, stored and monitored through the controller unit. The results of these measurements can be reported via a data medium, a wired and/or wireless network, e.g. via dongle 600, or through any appropriate data transmission and/or storage mechanism.

The subject matter of embodiments of the present invention is described here with specificity to meet statutory requirements, but this description is not necessarily intended to limit the scope of the claims. The claimed subject matter can be embodied in other ways, can include different elements or steps, and can be used in conjunction with other existing or future technologies. This description should not be interpreted as implying any particular order or arrangement among or between various steps or elements except when the order of individual steps or arrangement of elements is explicitly described. The embodiments and examples discussed herein are non-limiting examples. The invention is described in detail with respect to preferred embodiments, and it will now be apparent from the foregoing to those skilled in the art that changes and modifications can be made without departing from the invention in its broader aspects, and the invention, therefore, as defined in the claims is intended to cover all such changes and modifications as fall within the true spirit of the invention.

What is claimed is:

1. A pool maintenance system for maintaining desired characteristics of a body of water in fluid communication therewith, the system comprising:
   a water circulation pump in fluid communication with said body of water via a series of water conduits, said water circulation pump having an integral, discrete power supply unit and transformer integrated therewith;
   a water purification mechanism in fluid communication with said water circulation pump, and electrically communicatively coupled, via a power input of said water purification mechanism, with said power supply unit and transformer integrated with said water circulation pump; and
   said power supply unit and transformer integrated with said water circulation pump functions as a single shared power source for said water circulation pump and said water purification mechanism.

2. A pool maintenance system as recited in claim 1, further comprising at least one of a wired interface and a wireless interface, said at least one interface electrically connected to said power supply unit and transformer integrated with said water circulation pump.

3. A pool maintenance system as recited in claim 2, wherein said interface communicates with a portable smart device, thereby enabling user-control from the portable smart device, via said interface, of at least one of said water circulation pump and said water purification mechanism.

4. A pool maintenance system as recited in claim 3, said water purification mechanism further comprising a salt water chlorinator subassembly, including a plurality of parallel-oriented chlorinator cell metal electrode plates.

5. A pool maintenance system as recited in claim 2, wherein said interface communicates with an internet-connected user-accessible device enabling remote user control of said water circulation pump and said water purification mechanism.

6. A pool maintenance system for maintaining desired characteristics of a body of water in fluid communication therewith, the system comprising:
   a water circulation pump in fluid communication with said body of water via a series of water conduits;
   a heat pump having a heat pump enclosure, said heat pump in fluid communication with said water circulation pump, and said heat pump having an integral, discrete power supply unit and transformer integrated therewith;
   a water purification mechanism having an integral power input, said water purification mechanism in fluid communication with said heat pump and with said water circulation pump, and said water purification mechanism electrically communicatively coupled, via a power input of said water purification mechanism, with said power supply unit and transformer integrated with said heat pump; and
   said power supply unit and transformer integrated with said heat pump functions as a single shared power source for said heat pump and said water purification mechanism.

7. A pool maintenance system as recited in claim 6, said heat pump further comprising a water purification mechanism driver interposed between, and electrically coupling, said heat pump power supply unit and transformer with the integral power input of said water purification mechanism, wherein electrical power supplied by said heat pump power source is electrically communicated from said heat pump power supply unit and transformer to the integral power input of said water purification mechanism, via said water purification mechanism driver.

8. A pool maintenance system as recited in claim 7, said water purification mechanism further comprising a salt water chlorinator subassembly, including a plurality of parallel-oriented chlorinator cell metal electrode plates.

9. A pool maintenance system as recited in claim 7, said water purification mechanism physically integrated within an interior space defined by said heat pump enclosure.

10. A pool maintenance system as recited in claim 9, said water purification mechanism further comprising a salt water chlorinator subassembly, including a plurality of parallel-oriented chlorinator cell metal electrode plates.

11. A pool maintenance system as recited in claim 6, further comprising at least one of a wired interface and a wireless interface, said at least one interface electrically connected to said power supply unit and transformer integrated with said heat pump, wherein said interface communicates with an internet-connected user-accessible device enabling remote user control of said water circulation pump and said water purification mechanism.

12. A pool maintenance system as recited in claim 11, wherein said interface communicates with a portable smart device, thereby enabling user-control from the portable smart device, via said interface, of at least one of said heat pump and said water purification mechanism.

13. A pool maintenance system as recited in claim 11, said water purification mechanism further comprising a salt water chlorinator subassembly, including a plurality of parallel-oriented chlorinator cell metal electrode plates.

14. A pool maintenance system as recited in claim 6, said water purification mechanism further comprising a salt water chlorinator subassembly, including a plurality of parallel-oriented chlorinator cell metal electrode plates.

15. A pool maintenance system for maintaining desired characteristics of a body of water in fluid communication therewith, the system comprising:
   a water circulation pump in fluid communication with said body of water via a series of water conduits;
   a heat pump having a heat pump enclosure, said heat pump in fluid communication with said water circulation pump;
   a salt water chlorinator subassembly having a power input, said salt water chlorinator subassembly in fluid communication with said heat pump and with said water circulation pump; and
   said salt water chlorinator subassembly electrically communicatively coupled, via said power input, with at least one of an integral, discrete power supply unit and transformer integrated with said water circulation pump, and an integral, discrete power supply unit and transformer integrated with said heat pump.

16. A pool maintenance system as recited in claim 15, wherein said salt water chlorinator subassembly further comprises:
   an electrolysis cell housing portion;
   a plurality of spaced-apart, parallel oriented chlorinator cell metal electrode plates contained within said electrolysis cell housing portion;
   a control circuit contained within a control circuit housing portion of said salt water chlorinator subassembly; and
   said electrolysis cell housing portion and said control circuit housing portion in fluid communication with one another.

17. A pool maintenance system as recited in claim 16, said salt water chlorinator subassembly communicatively coupled, via said power input, with an integral, discrete power supply unit and transformer integrated with said water circulation pump.

18. A pool maintenance system as recited in claim 16, said salt water chlorinator subassembly communicatively coupled, via said power input, with an integral, discrete power supply unit and transformer integrated with said heat pump.

19. A pool maintenance system as recited in claim 17, further comprising at least one of a wired interface and a wireless interface, said at least one interface electrically connected to said power supply unit and transformer integrated with said water circulation pump.

20. A pool maintenance system as recited in claim 18, further comprising at least one of a wired interface and a wireless interface, said at least one interface electrically connected to said power supply unit and transformer integrated with said heat pump.

* * * * *